(12) United States Patent
Lu et al.

(10) Patent No.: US 11,098,738 B2
(45) Date of Patent: Aug. 24, 2021

(54) TRANSCEIVER MODULE

(71) Applicant: DELTA ELECTRONICS, INC., Taoyuan (TW)

(72) Inventors: Chen-Mao Lu, Taoyuan (TW); Ming-Chia Wu, Taoyuan (TW); Wen-Ching Chuang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 682 days.

(21) Appl. No.: 16/013,577

(22) Filed: Jun. 20, 2018

(65) Prior Publication Data
US 2019/0203750 A1     Jul. 4, 2019

(30) Foreign Application Priority Data

Jan. 2, 2018   (CN) .......................... 201810000680.5

(51) Int. Cl.
| | | |
|---|---|---|
| *H04B 10/00* | (2013.01) | |
| *F16B 2/14* | (2006.01) | |
| *H04B 10/40* | (2013.01) | |
| *G02B 6/42* | (2006.01) | |

(52) U.S. Cl.
CPC .............. *F16B 2/14* (2013.01); *G02B 6/4246* (2013.01); *G02B 6/4261* (2013.01); *H04B 10/40* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,993,803 | A * | 2/1991 | Suverison | ............ | G02B 6/3817 250/227.11 |
| 5,140,663 | A * | 8/1992 | Edwards | .............. | G02B 6/3869 385/139 |
| 5,515,468 | A * | 5/1996 | DeAndrea | ............ | G02B 6/4201 385/88 |
| 6,074,228 | A * | 6/2000 | Berg | ...................... | H01R 12/57 385/75 |
| 6,229,708 | B1 * | 5/2001 | Corbin, Jr. | ........... | H05K 7/1431 361/725 |
| 6,430,053 | B1 * | 8/2002 | Peterson | ............ | H01R 13/6335 361/728 |
| 6,666,484 | B1 * | 12/2003 | Branch | ..................... | E05C 3/14 292/128 |

(Continued)

*Primary Examiner* — Agustin Bello
(74) *Attorney, Agent, or Firm* — Muncy, Geissler, Olds & Lowe, P.C.

(57) ABSTRACT

A transceiver module is provided. The transceiver module includes a housing, a latch and a torsion spring. The housing includes a positioning post and a block. The latch includes a wedging protrusion. The torsion spring includes a coil portion, a first extending portion and a second extending portion, wherein the first extending portion and the second extending portion are connected to the coil portion, the first extending portion includes a first free end, the second extending portion includes a second free end, and the first extending portion intersects the second extending portion at an intersection point on a projection plane. A first area, a second area, a third area and a fourth area are defined by the torsion spring clockwise around the intersection point, the coil portion surrounds the positioning post in the first area, and the first free end is adapted to connect the latch.

18 Claims, 17 Drawing Sheets

(56) References Cited

U.S. PATENT DOCUMENTS

| | | | | |
|---|---|---|---|---|
| 6,752,663 B2* | 6/2004 | Bright | G02B 6/4201 | 439/607.25 |
| 6,840,680 B1* | 1/2005 | Chiu | G02B 6/3825 | 385/53 |
| 7,040,911 B1* | 5/2006 | Ho | G02B 6/4292 | 439/352 |
| 7,056,156 B1* | 6/2006 | Hanley | H01R 13/6596 | 439/677 |
| 7,059,887 B1* | 6/2006 | Liu | H01R 13/6582 | 439/372 |
| 7,116,912 B2* | 10/2006 | Pang | G02B 6/4201 | 398/139 |
| 7,215,554 B2* | 5/2007 | Torres | H01R 13/6582 | 361/747 |
| 7,215,883 B1* | 5/2007 | Lewis | H04B 10/077 | 398/17 |
| 7,255,490 B2* | 8/2007 | Zhang | G02B 6/4246 | 385/139 |
| 7,317,862 B2* | 1/2008 | Minota | G02B 6/4292 | 385/134 |
| 7,322,854 B2* | 1/2008 | Long | H05K 9/0058 | 439/607.28 |
| 7,347,711 B1* | 3/2008 | Bianchini | G02B 6/4201 | 439/357 |
| 7,508,677 B2* | 3/2009 | Ice | G02B 6/4277 | 361/752 |
| 7,534,052 B2* | 5/2009 | Fujiwara | G02B 6/4292 | 385/88 |
| 8,064,207 B2* | 11/2011 | Wu | G02B 6/4284 | 361/747 |
| 8,385,076 B2* | 2/2013 | Peng | H05K 7/1401 | 361/740 |
| RE44,664 E* | 12/2013 | McColloch | G02B 6/4249 | 385/89 |
| 8,936,403 B2* | 1/2015 | Howard | G02B 6/4212 | 385/89 |
| 8,977,088 B2* | 3/2015 | Castagna | G02B 6/4206 | 385/49 |
| 9,128,257 B2* | 9/2015 | Otte | G02B 6/4256 | |
| 9,134,489 B2* | 9/2015 | Zbinden | G02B 6/4214 | |
| 9,219,333 B2* | 12/2015 | Wang | G02B 6/3897 | |
| 9,383,529 B1* | 7/2016 | Yashar | G02B 6/423 | |
| 9,918,416 B2* | 3/2018 | Mao | G02B 6/4277 | |
| 10,042,130 B1* | 8/2018 | Wang | G02B 6/4261 | |
| 10,101,537 B2* | 10/2018 | Nelson | G02B 6/3807 | |
| 10,177,494 B1* | 1/2019 | Lu | H01R 13/6275 | |
| 10,330,873 B2* | 6/2019 | Chuang | G02B 6/4292 | |
| 10,466,427 B2* | 11/2019 | Wang | G02B 6/4214 | |
| 10,539,753 B1* | 1/2020 | Leigh | H01L 23/40 | |
| 2002/0110336 A1* | 8/2002 | Dair | G02B 6/4256 | 385/92 |
| 2002/0110338 A1* | 8/2002 | Dair | G02B 6/4246 | 385/92 |
| 2002/0150343 A1* | 10/2002 | Chiu | G02B 6/3897 | 385/53 |
| 2002/0150344 A1* | 10/2002 | Chiu | G02B 6/3897 | 385/53 |
| 2002/0159712 A1* | 10/2002 | Holmquist | G02B 6/3878 | 385/70 |
| 2003/0020998 A1* | 1/2003 | Kuczynski | G02B 6/4253 | 359/245 |
| 2003/0194190 A1* | 10/2003 | Huang | G02B 6/4201 | 385/92 |
| 2003/0198025 A1* | 10/2003 | Cao | G02B 6/4284 | 361/728 |
| 2005/0148223 A1* | 7/2005 | Shirk | G02B 6/4246 | 439/160 |
| 2005/0196109 A1* | 9/2005 | Kim | G02B 6/4292 | 385/92 |
| 2005/0201074 A1* | 9/2005 | Huang | G02B 6/4292 | 361/801 |
| 2006/0029332 A1* | 2/2006 | Chiu | G02B 6/4261 | 385/53 |
| 2006/0178057 A1* | 8/2006 | Lloyd | G02B 6/4292 | 439/701 |
| 2006/0215968 A1* | 9/2006 | Kayner | G02B 6/4284 | 385/89 |
| 2007/0066248 A1* | 3/2007 | Ka | G02B 6/4292 | 455/90.3 |
| 2007/0117458 A1* | 5/2007 | Winker | G02B 6/4277 | 439/607.01 |
| 2007/0123090 A1* | 5/2007 | Kim | G02B 6/4201 | 439/372 |
| 2008/0315528 A1* | 12/2008 | Moore | H05K 9/0058 | 277/314 |
| 2009/0010600 A1* | 1/2009 | Kim | G02B 6/4246 | 385/90 |
| 2009/0176401 A1* | 7/2009 | Gu | H01R 13/62933 | 439/372 |
| 2009/0274468 A1* | 11/2009 | Zhang | G02B 6/4201 | 398/139 |
| 2011/0051373 A1* | 3/2011 | McColloch | G02B 6/4246 | 361/709 |
| 2011/0081114 A1* | 4/2011 | Togami | G02B 6/4246 | 385/76 |
| 2012/0213479 A1* | 8/2012 | Zhu | G02B 6/4261 | 385/76 |
| 2013/0148929 A1* | 6/2013 | Huang | G02B 6/36 | 385/77 |
| 2013/0210269 A1* | 8/2013 | Neer | H05K 7/20145 | 439/487 |
| 2014/0010514 A1* | 1/2014 | McColloch | G02B 6/4261 | 385/136 |
| 2014/0153192 A1* | 6/2014 | Neer | H05K 9/0058 | 361/704 |
| 2014/0161398 A1* | 6/2014 | Yi | G02B 6/36 | 385/92 |
| 2014/0169749 A1* | 6/2014 | Yi | G02B 6/4284 | 385/135 |
| 2014/0196943 A1* | 7/2014 | Hirschy | G02B 6/4246 | 174/382 |
| 2014/0219615 A1* | 8/2014 | Petersen | G02B 6/3817 | 385/88 |
| 2015/0188636 A1* | 7/2015 | Su | H04B 10/40 | 398/135 |
| 2016/0077287 A1* | 3/2016 | Isenhour | G02B 6/32 | 385/76 |
| 2016/0216460 A1* | 7/2016 | Yang | G02B 6/4246 | |
| 2016/0238805 A1* | 8/2016 | McColloch | G02B 6/4257 | |
| 2017/0196097 A1* | 7/2017 | Barwicz | H01L 21/4853 | |
| 2017/0254973 A1* | 9/2017 | Yu | G02B 6/4244 | |
| 2017/0363828 A1* | 12/2017 | Zhu | G02B 6/42 | |
| 2018/0113261 A1* | 4/2018 | Han | G02B 6/4215 | |
| 2018/0172927 A1* | 6/2018 | Song | G02B 6/26 | |
| 2018/0172942 A1* | 6/2018 | Bauco | G02B 6/0006 | |
| 2018/0210156 A1* | 7/2018 | Lin | G02B 6/4215 | |
| 2018/0252871 A1* | 9/2018 | Yeh | G02B 6/4292 | |
| 2018/0329161 A1* | 11/2018 | Takeuchi | G02B 6/4246 | |
| 2018/0368283 A1* | 12/2018 | Little | H05K 7/20336 | |
| 2019/0090370 A1* | 3/2019 | Luo | G02B 6/4292 | |
| 2019/0203750 A1* | 7/2019 | Lu | F16B 2/14 | |
| 2019/0212509 A1* | 7/2019 | Takeuchi | G02B 6/4292 | |
| 2019/0278037 A1* | 9/2019 | Leigh | E05C 3/14 | |
| 2019/0346637 A1* | 11/2019 | Schwerzig | G02B 6/4292 | |
| 2020/0049912 A1* | 2/2020 | Lu | H01R 13/6581 | |
| 2020/0278510 A1* | 9/2020 | Zhou | G02B 6/4261 | |
| 2020/0313348 A1* | 10/2020 | Liu | H01R 13/639 | |
| 2020/0335904 A1* | 10/2020 | Lu | G02B 6/4278 | |
| 2020/0363595 A1* | 11/2020 | Grann | G02B 6/29367 | |

* cited by examiner

TRANSCEIVER MODULE

CROSS REFERENCE TO RELATED APPLICATIONS

This Application claims priority of China Patent Application No. 201810000680.5, filed on Jan. 2, 2018, the entirety of which is incorporated by reference herein.

BACKGROUND OF THE INVENTION

Field of the Invention

The present invention relates to a transceiver module, and in particular to a small form factor pluggable transceiver module.

Description of the Related Art

Photoelectric communication devices such as hubs (network devices) include at least one transceiver module. The transceiver module transforms optical signals into electronic signals. The optical fibers connect the network devices via the transceiver modules. Recently, the transceiver modules of the gigabit interface converter (GBIC) have been replaced by small form factor (SFF) transceiver modules or small form factor pluggable (SFP) transceiver modules.

In conventional small form factor pluggable (SFP) transceiver modules, a wedging protrusion sinks into the housing to separate the transceiver module from the cage by rotating the handle. However, to separate the transceiver module from the cage, the fiber must be removed first, and then the handle is rotated to sink the wedging protrusion into the housing. This detaching process is inconvenient.

BRIEF SUMMARY OF THE INVENTION

In one embodiment, a transceiver module is provided. The transceiver module includes a housing, a latch and a torsion spring. The housing includes a positioning post and a block. The latch includes a wedging protrusion. The torsion spring includes a coil portion, a first extending portion and a second extending portion. The first extending portion and the second extending portion are connected to the coil portion. The first extending portion comprises a first free end. The second extending portion comprises a second free end. The first extending portion intersects the second extending portion at an intersection point on a projection plane. A first area, a second area, a third area and a fourth area are defined by the torsion spring clockwise around the intersection point. The coil portion surrounds the positioning post in the first area. The first free end is adapted to connect the latch. When the latch is moved from a first latch position to a second latch position, the latch applies a pushing force upon the torsion spring, the block abuts the torsion spring to restrict the rotation of the torsion spring, the torsion spring applies an elastic force upon the latch and the block, and the wedging protrusion of the latch moves from a first wedging protrusion position to a second wedging protrusion position.

In one embodiment, the block is located in the second area, and is adapted to abut the first extending portion.

In one embodiment, the block abuts the first extending portion at an abutting point, and a distance between the abutting point and the intersection point is less than one third of the length of the first extending portion.

In one embodiment, the block is located in the third area, and is adapted to abut the second extending portion.

In one embodiment, the block abuts the second extending portion at an abutting point, a distance between the abutting point and the intersection point is less than one third of the length of the second extending portion.

In one embodiment, the block abuts the second extending portion at an abutting point, a distance between the abutting point and the second free end is less than two thirds of the length of the second extending portion.

In one embodiment, the block is a cylinder, a polygonal pillar or an irregular-shaped pillar.

In one embodiment, the transceiver module further comprises a handle, wherein the handle pivots on the latch, and the latch pivots on the housing.

In one embodiment, when the handle is moved from a first handle position to a second handle position, the latch is rotated from the first latch position to the second latch position, and the wedging protrusion is moved from the first wedging protrusion position to the second wedging protrusion position.

In one embodiment, the latch pivots around a pivot direction relative to the housing, and an extension direction of the positioning post parallel to the pivot direction.

In one embodiment, a transceiver module is provided. The transceiver module includes a housing, a latch and a torsion spring. The housing comprises a positioning post and a connection portion. The latch comprises a wedging protrusion. The torsion spring comprises a coil portion, a first extending portion and a second extending portion. The first extending portion and the second extending portion are connected to the coil portion. The first extending portion comprises a first free end, the second extending portion comprises a second free end. The first extending portion intersects the second extending portion at an intersection point on a projection plane. A first area, a second area, a third area and a fourth area are defined by the torsion spring clockwise around the intersection point. The coil portion surrounds the positioning post in the first area. The first free end is adapted to connect the latch. The second free end is connected to the connection portion. When the latch is moved from a first latch position to a second latch position, the torsion spring applies an elastic force upon the latch and the connection portion, and the wedging protrusion of the latch moves from a first wedging protrusion position to a second wedging protrusion position.

In one embodiment, the housing further comprises a block, and when the latch is moved from the first latch position to the second latch position, the block abuts the torsion spring to restrict the rotation of the torsion spring, and the torsion spring applies the elastic force on the latch, the connection portion and the block.

In one embodiment, the block is located in the second area, and is adapted to abut the first extending portion.

In one embodiment, the block is located in the third area, and is adapted to abut the second extending portion.

In one embodiment, the block is a cylinder, a polygonal pillar or an irregular-shaped pillar.

In one embodiment, the transceiver module further comprises a handle, wherein the handle pivots on the latch, and the latch pivots on the housing.

In one embodiment, when the handle is moved from a first handle position to a second handle position, the latch is rotated from the first latch position to the second latch position, and the wedging protrusion is moved from the first wedging protrusion position to the second wedging protrusion position.

In one embodiment, the latch pivots around a pivot direction relative to the housing, and an extension direction of the positioning post parallel to the pivot direction.

Utilizing the embodiments of the invention, the movement reliability of the wedging protrusion can be improved by the latch and the torsion spring mentioned above. In this embodiment, the translation of the handle sinks the wedging protrusion into the housing, and the transceiver module therefore can be separated from the cage. The user can easily separate the transceiver module from the cage on by pulling the handle.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
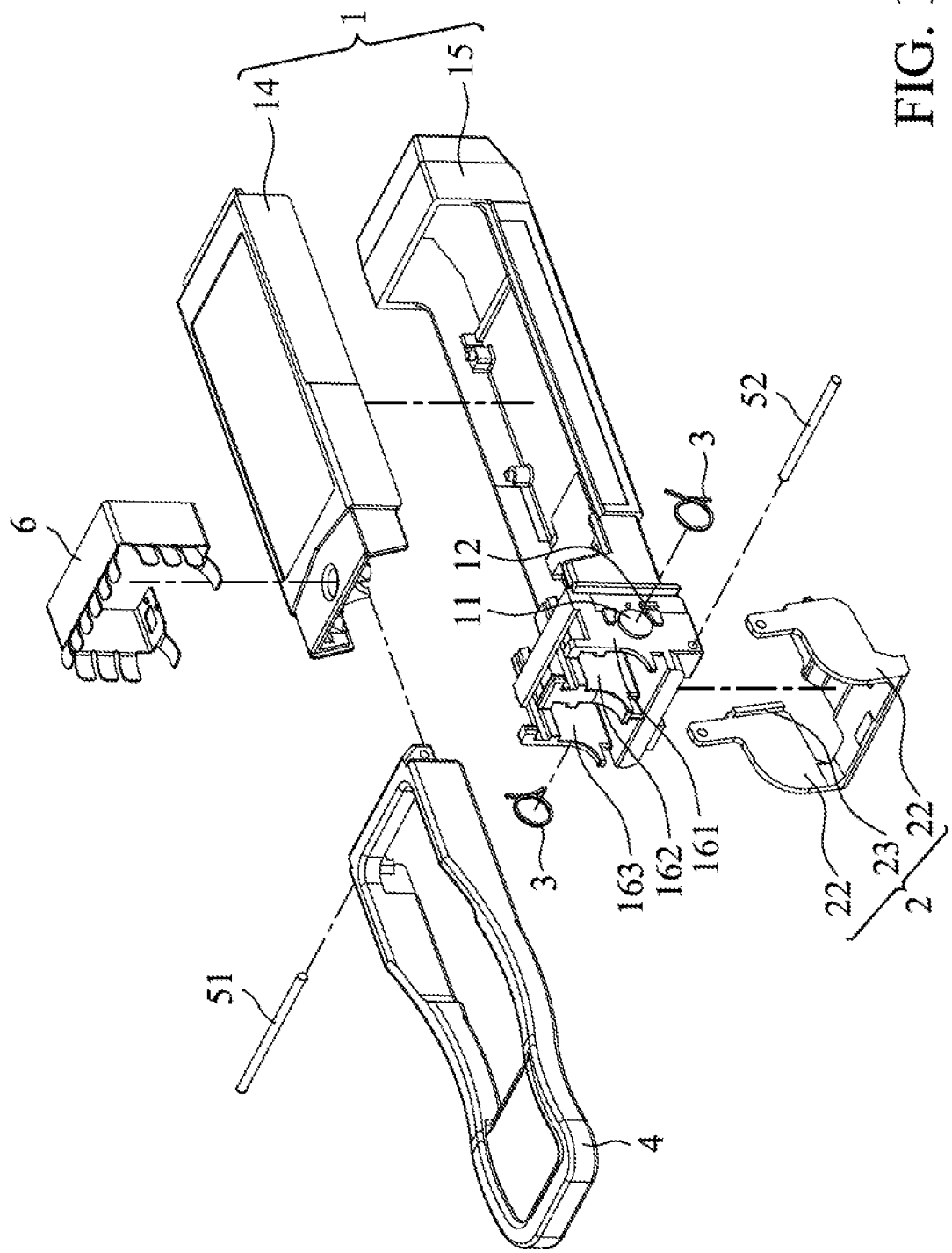
FIG. 1A is an exploded view of the transceiver module of the embodiment of the invention.
Figure 1B:
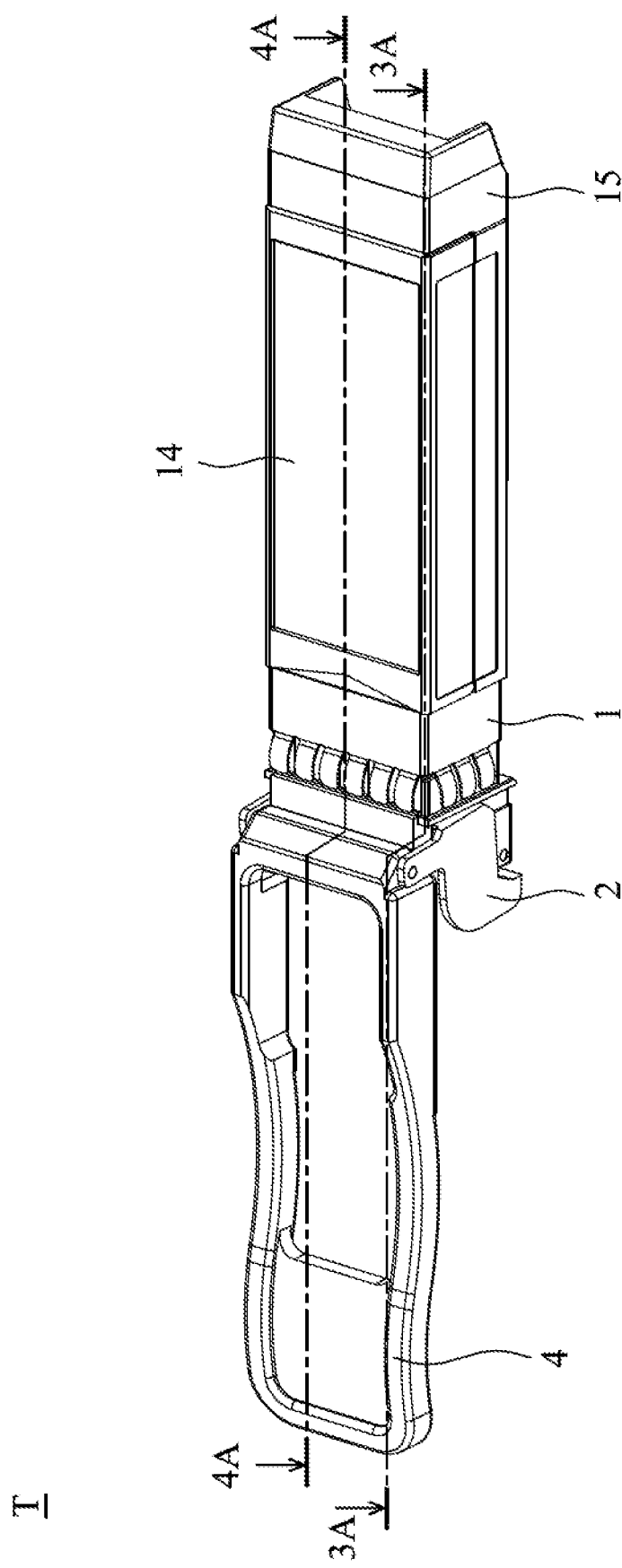
FIG. 1B is an assembled view of the transceiver module of the embodiment of the invention.
Figure 1C:
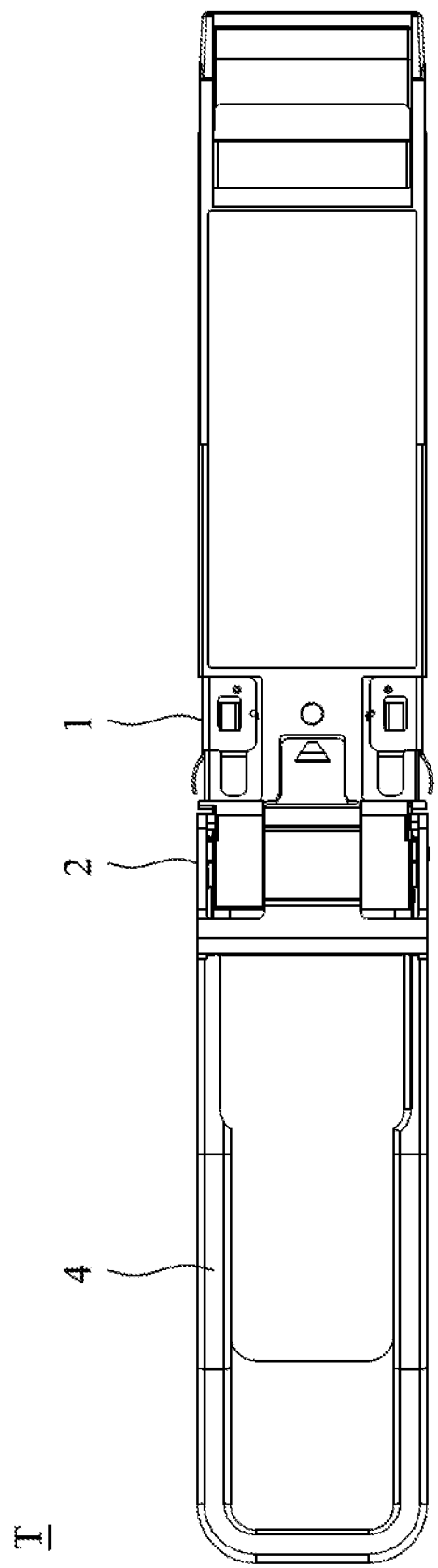
FIG. 1C is a bottom view of the transceiver module of the embodiment of the invention.
Figure 1D:
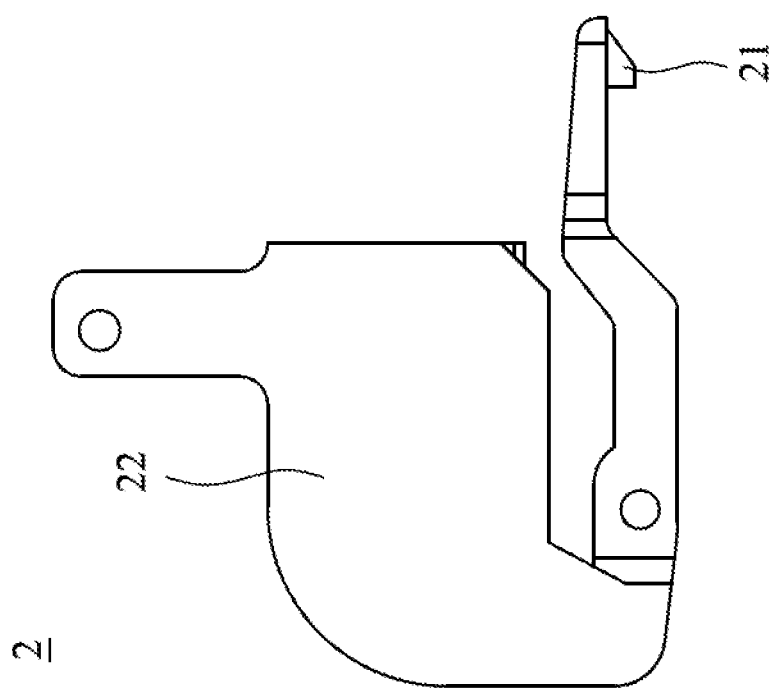
FIG. 1D is a side view of the latch of the embodiment of the invention.
Figure 1E:
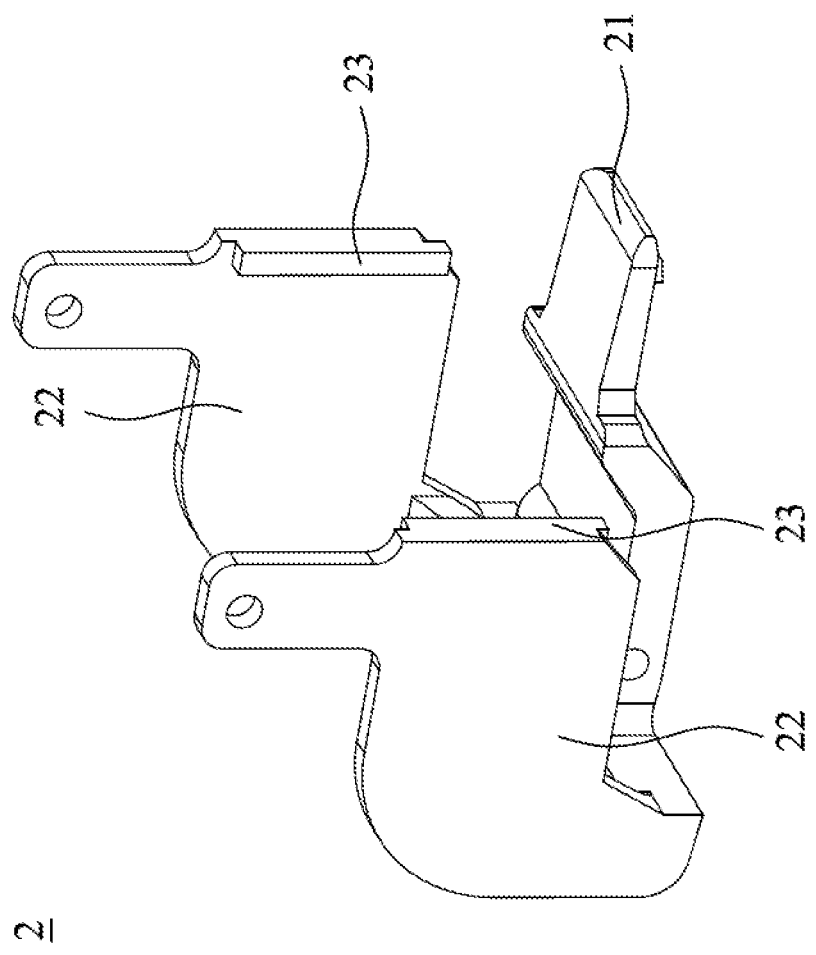
FIG. 1E is a perspective view the latch of the embodiment of the invention.
Figure 2A:
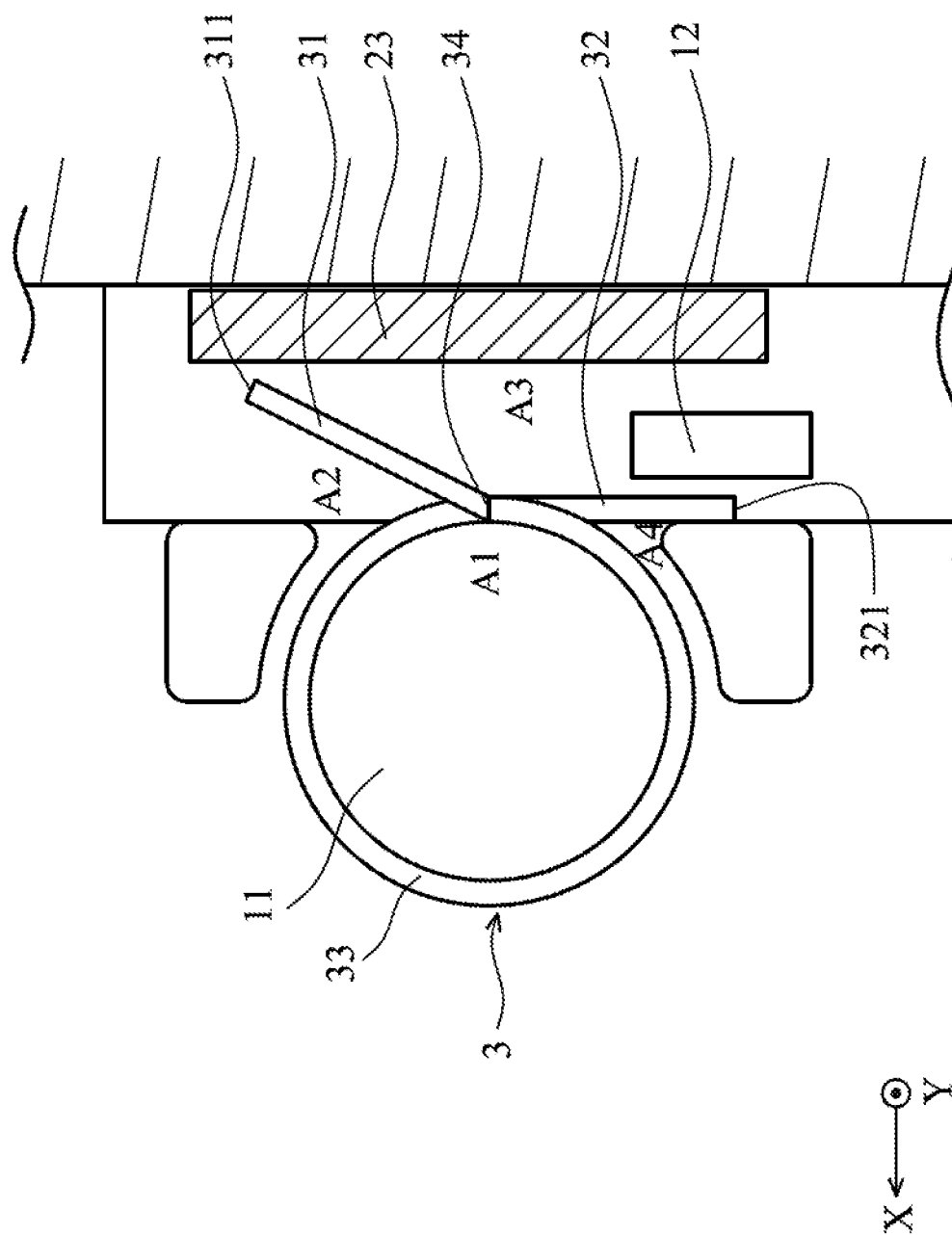
FIG. 2A shows the details of the torsion spring of the first embodiment of the invention, wherein the latch is in the first latch position.

FIG. 1A is an exploded view of a transceiver module T of an embodiment of the invention. FIG. 1B is an assembled view of the transceiver module T of the embodiment of the invention. FIG. 1C is a bottom view of the transceiver module T of the embodiment of the invention. FIG. 1D is a side view of the latch of the embodiment of the invention. FIG. 1E is a perspective view the latch of the embodiment of the invention. With reference to FIGS. 1A, 1B and 1C, the transceiver module T of the embodiment of the invention includes a housing 1, a latch 2 and a torsion spring 3. With reference to FIGS. 1A and 2A, in this embodiment, the housing 1 includes a positioning post 11 and a block 12. The positioning post 11 and the block 12 are formed on a first side wall 161 and a third side wall 163 of the housing 1. A second side wall 162 is formed between the first side wall 161 and the third side wall 163. The torsion spring 3 is sandwiched between the latch 2 and the housing 1, and is telescoped on the positioning post 11. With reference to FIGS. 1D and 1E, the latch 2 includes a wedging protrusion 21, two latch side plates 22 and an abutting portion 23.

With reference to FIG. 2A, the torsion spring 3 includes a coil portion 33, a first extending portion 31 and a second extending portion 32. The first extending portion 31 and the second extending portion 32 are connected to the coil portion 33. The first extending portion 31 comprises a first free end 311. The second extending portion 32 comprises a second free end 321. The first extending portion 31 intersects the second extending portion 32 at an intersection point 34 on a projection plane. A first area A1, a second area A2, a third area A3 and a fourth area A4 are defined by the torsion spring 3 clockwise around the intersection point 34. The coil portion 33 surrounds the positioning post 11 in the first area A1. The first free end 311 is adapted to connect the abutting portion 23 of the latch 2.

Figure 2B:
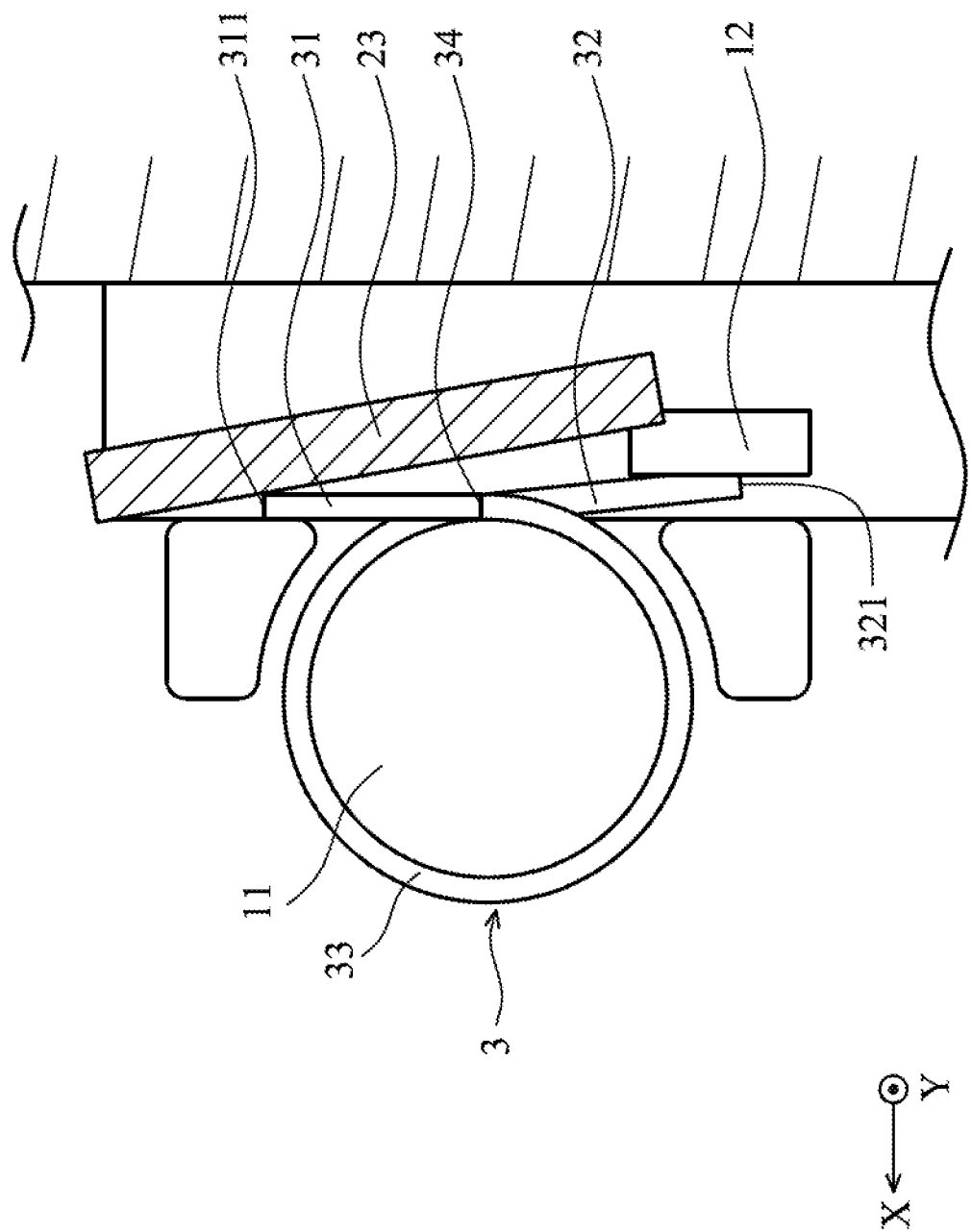
FIG. 2B shows the details of the torsion spring of the first embodiment of the invention, wherein the latch is in the second latch position.
Figure 3A:
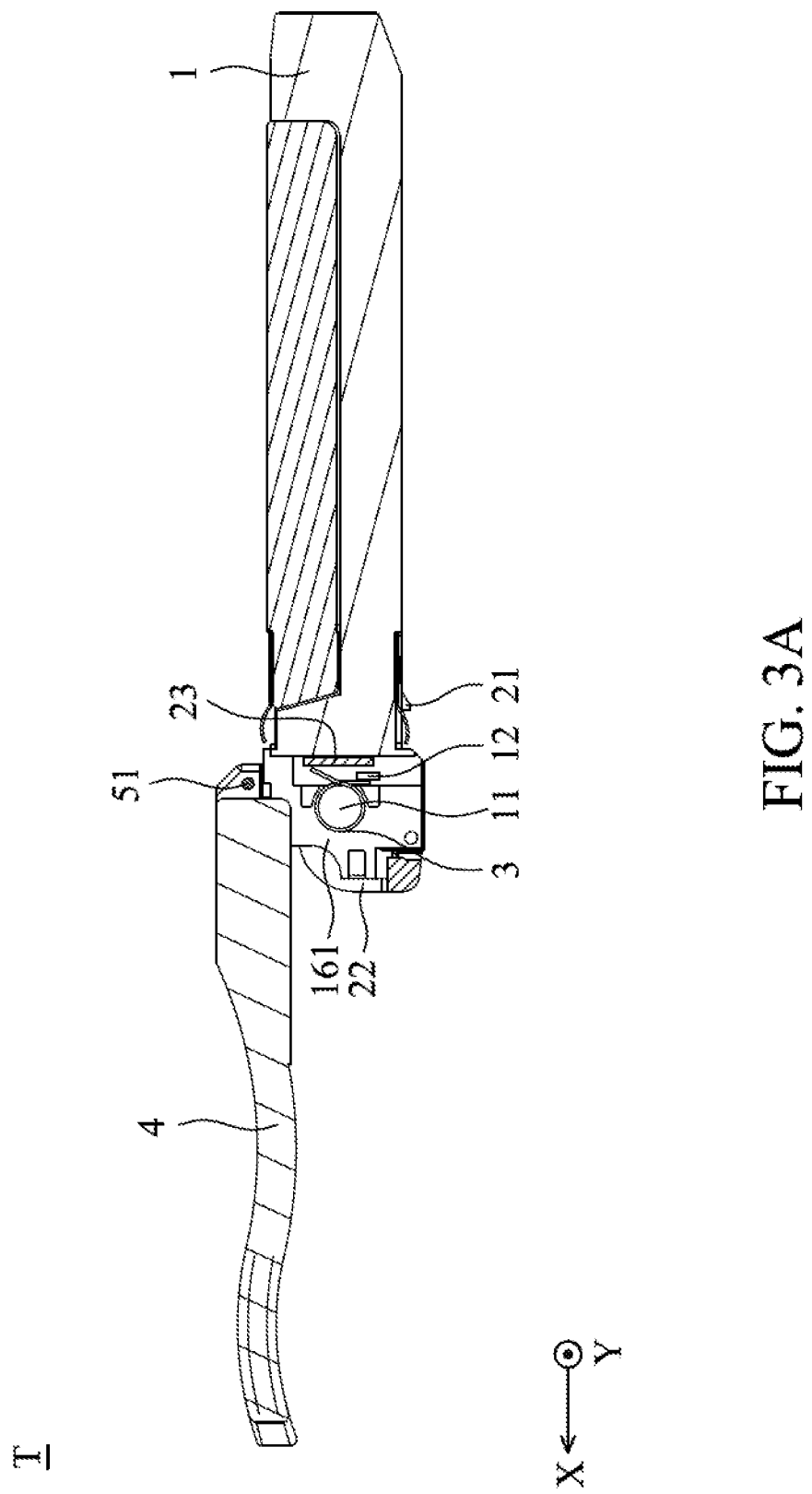
FIG. 3A is a sectional view along the 3A-3A direction of FIG. 1B, wherein the latch is in the first latch position.
Figure 3B:
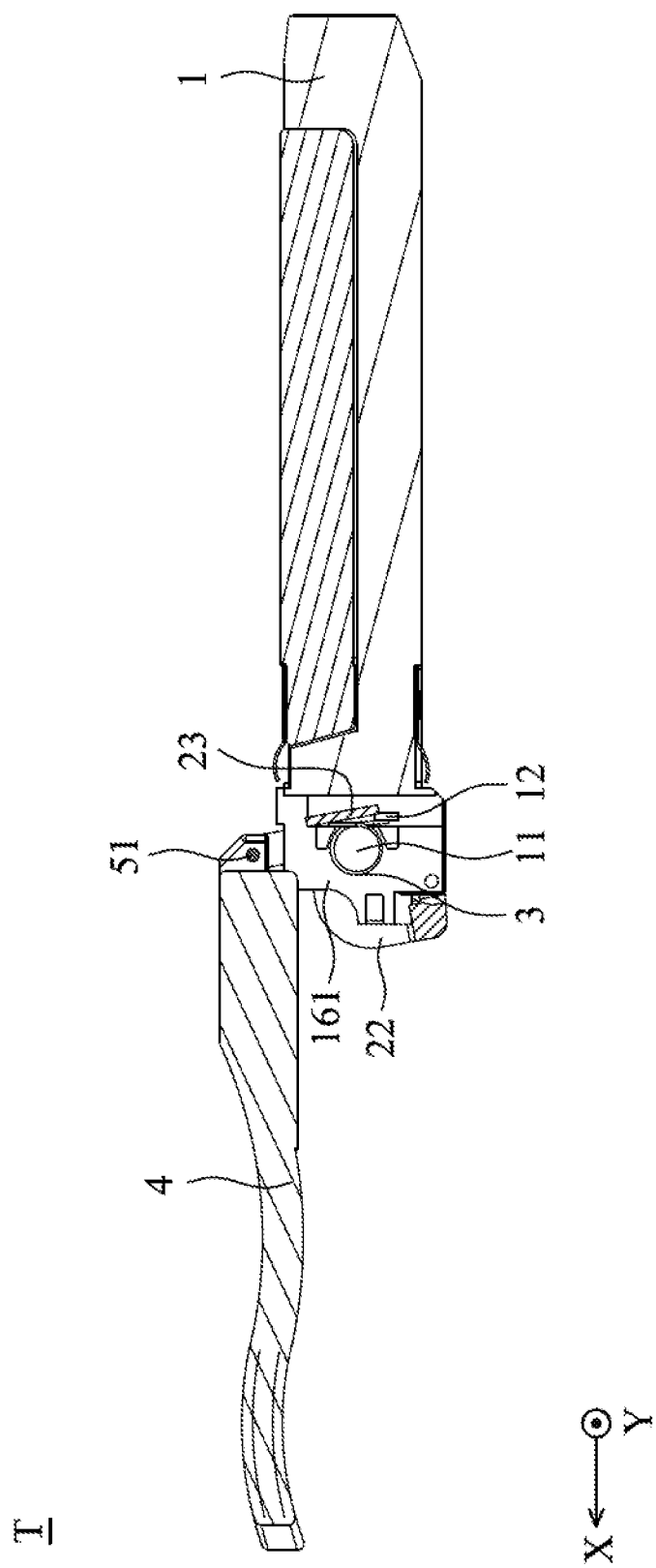
FIG. 3B shows the latch in the second latch position of the first embodiment of the invention.
Figure 4A:
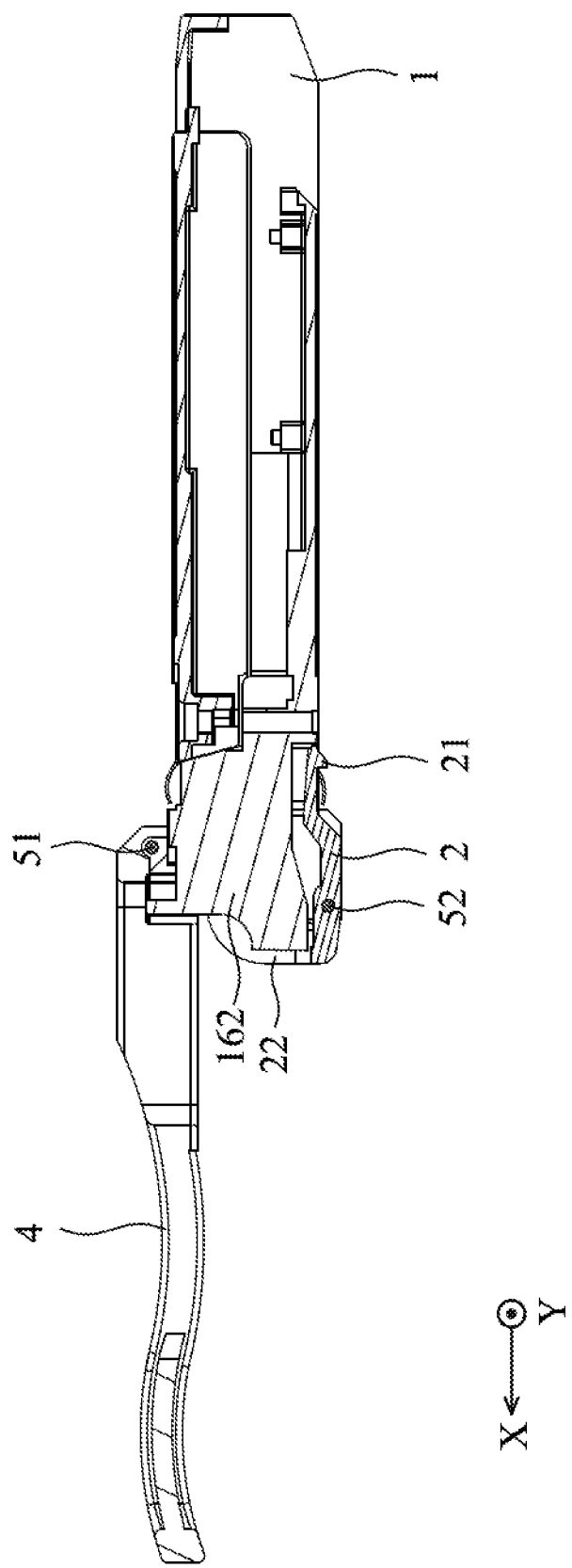
FIG. 4A is a sectional view along the 4A-4A direction of FIG. 1B, wherein the wedging protrusion is in the first wedging protrusion position.
Figure 4B:
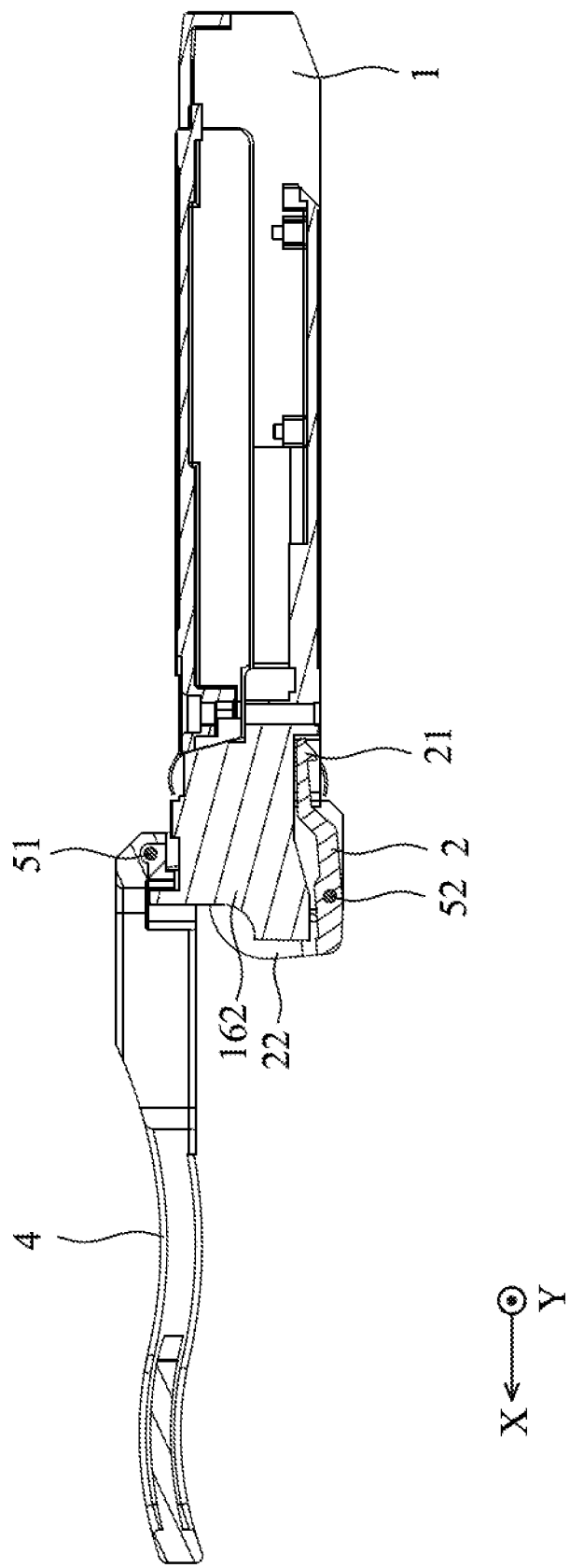
FIG. 4B shows the wedging protrusion in the second wedging protrusion position of the first embodiment of the invention.

When the latch 2 is moved from a first latch position (FIGS. 2A and 3A) to a second latch position (FIGS. 2B and 3B). The abutting portion 23 of the latch 2 applies a pushing force upon the torsion spring 3. The block 12 abuts the torsion spring 3 to restrict the rotation of the torsion spring 3. The torsion spring 3 applies an elastic force upon the abutting portion 23 of the latch 2 and the block 12. Simultaneously, the wedging protrusion 21 of the latch 2 moves from a first wedging protrusion position (FIGS. 3A and 4A) to a second wedging protrusion position (FIGS. 3B and 4B). In FIG. 4B, the wedging protrusion 21 sinks into the housing 1, and the transceiver module therefore can be separated from a cage.

With reference to FIG. 2A, in this embodiment, the block 12 is located in the third area A3, and is adapted to abut the second extending portion 32.

With reference to FIGS. 1A, 1B and 1C, in one embodiment, the transceiver module T further comprises a handle 4, wherein the handle 4 pivots on the latch 2 via a shaft 51, and the latch 2 pivots on the housing 1 via a shaft 52. With reference to FIGS. 4A and 4B, in one embodiment, when the handle 4 is moved from a first handle position (FIG. 4A) to a second handle position (FIG. 4B) along a translation direction X. The latch 2 is rotated from the first latch position (FIG. 4A) to the second latch position (FIG. 4B), and the wedging protrusion 21 is moved from the first wedging protrusion position (FIG. 4A) to the second wedging protrusion position (FIG. 4B). In this embodiment, the translation of the handle 4 sinks the wedging protrusion 21 into the housing 1, and the transceiver module therefore can be separated from the cage. The user can easily separate the transceiver module from the cage on by pulling the handle 4.

With reference to FIGS. 3A and 3B, in one embodiment, the latch 2 pivots around a pivot direction Y relative to the housing 1, and an extension direction of the positioning post 11 parallel to the pivot direction Y.

Figure 5A:
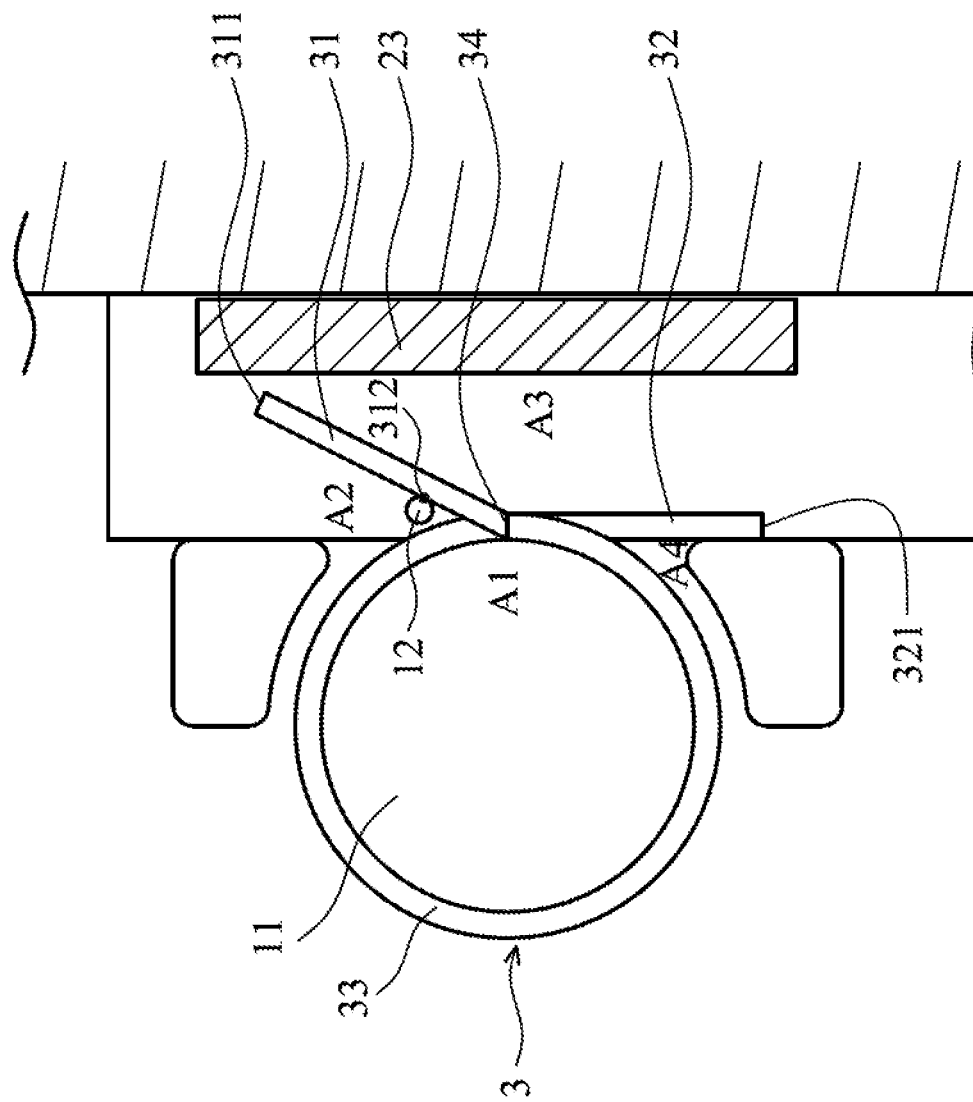
FIG. 5A shows the transceiver module of the second embodiment of the invention.

In different embodiments, the block can be a cylinder, a polygonal pillar or an irregular-shaped pillar. With reference to FIG. 5A, in this embodiment, the block 12 is a cylinder. The block 12 is located in the second area A2, and is adapted to abut the first extending portion 31. In one embodiment, the block 12 abuts the first extending portion 31 at an abutting point 312, and the distance between the abutting point 312 and the intersection point 34 is less than one third of the length of the first extending portion 31. Therefore, the first extending portion 31 provides sufficient elastic deformation.

Figure 5B:
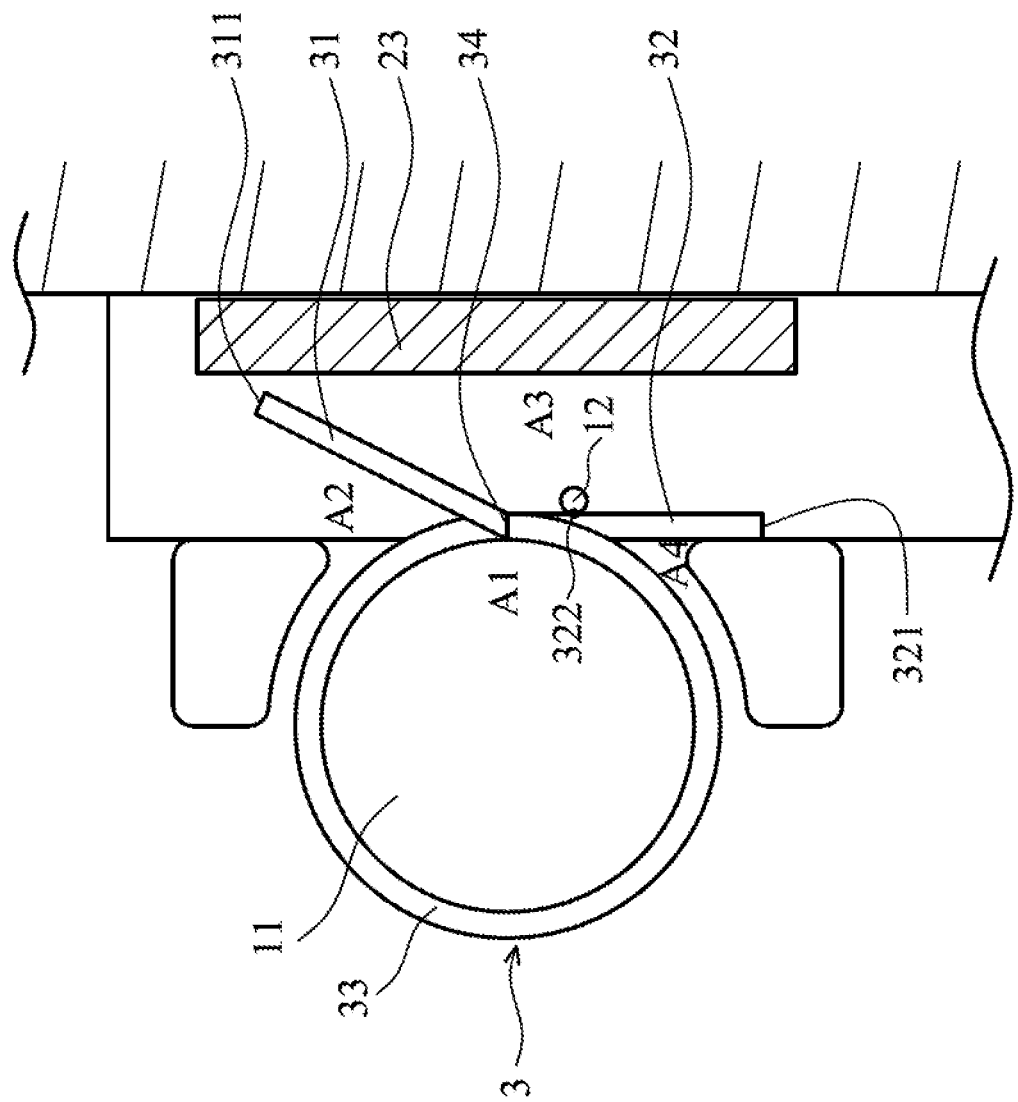
FIG. 5B shows the transceiver module of the third embodiment of the invention.

With reference to FIG. 5B, in another embodiment, the block 12 is located in the third area A3, and is adapted to abut the second extending portion 32. The block 12 abuts the second extending portion 32 at an abutting point 322. The distance between the abutting point 322 and the intersection point 34 is less than one third of the length of the second extending portion 32.

Figure 5C:
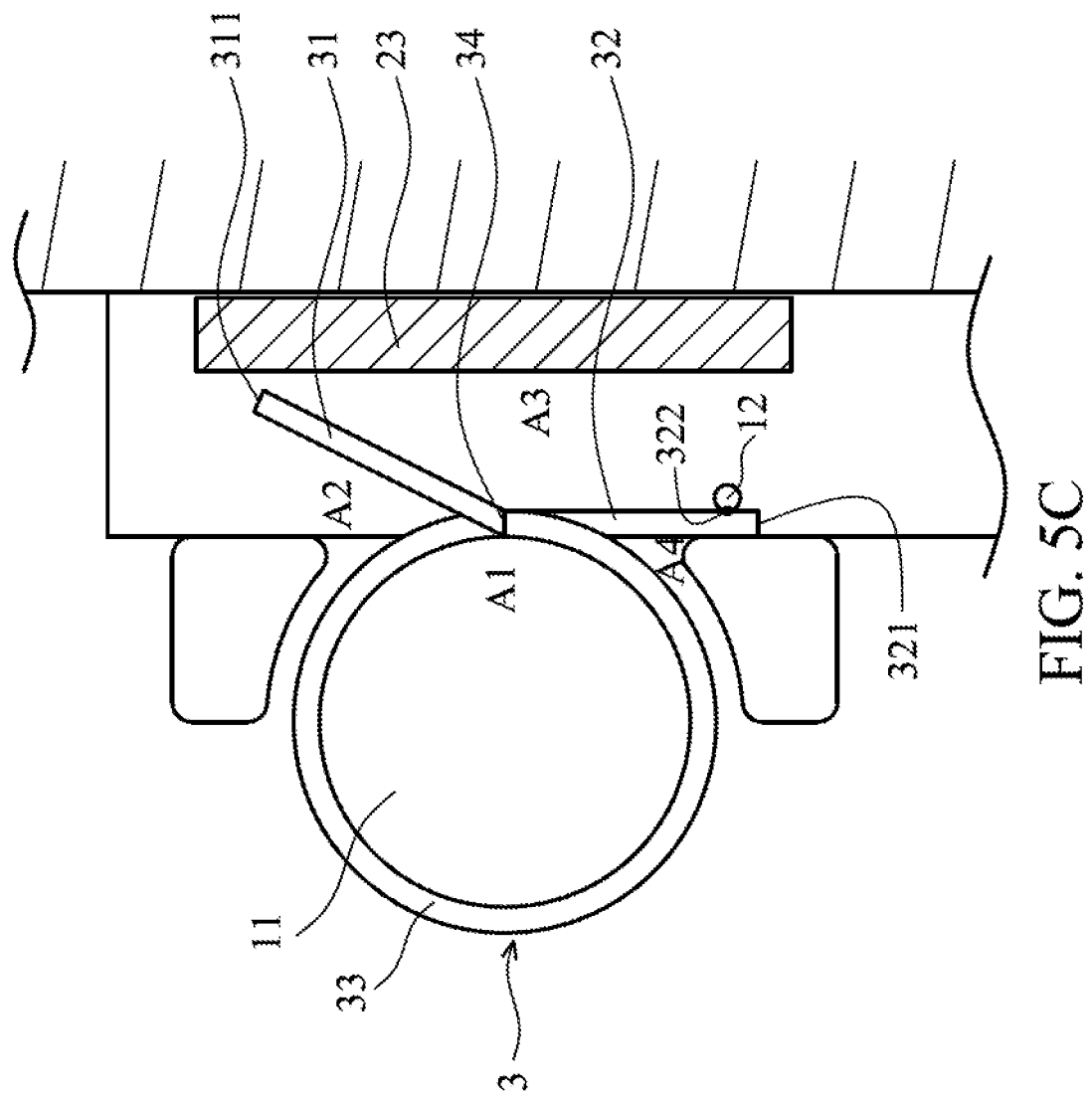
FIG. 5C shows the transceiver module of the fourth embodiment of the invention.

With reference to FIG. 5C, in another embodiment, the block 12 abuts the second extending portion 32 at an abutting point 322, the distance between the abutting point 322 and the second free end 321 is less than two thirds of the length of the second extending portion 32.

In the embodiments above, the elastic force of the torsion spring 3 can be modified by changing the position of the block 12.

Figure 6A:
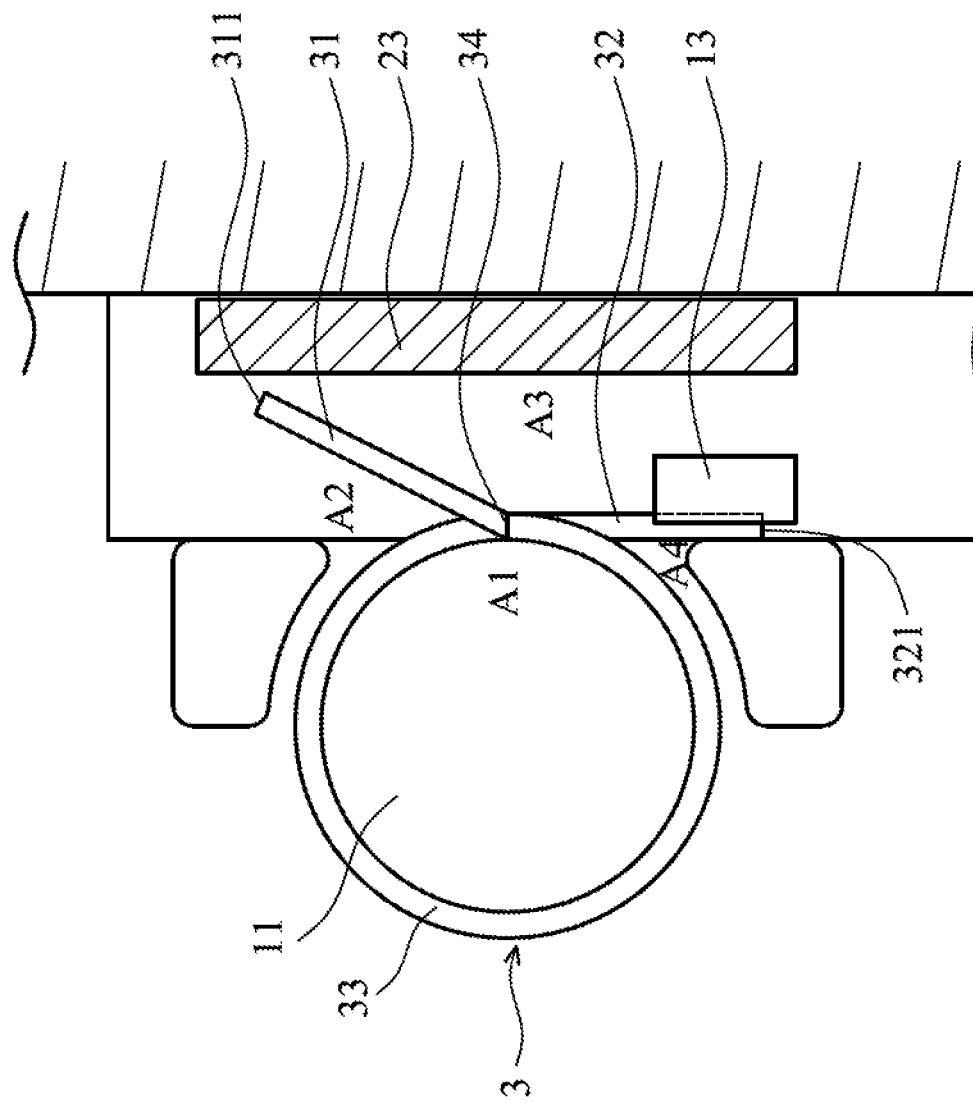
FIG. 6A shows the transceiver module of the fifth embodiment of the invention.

With reference to FIG. 6A, in another embodiment, the torsion spring 3 includes a coil portion 33, a first extending portion 31 and a second extending portion 32. The first extending portion 31 and the second extending portion 32 are connected to the coil portion 33. The first extending portion 31 comprises a first free end 311. The second extending portion 32 comprises a second free end 321. The first extending portion 31 intersects the second extending portion 32 at an intersection point 34 on a projection plane. A first area A1, a second area A2, a third area A3 and a fourth area A4 are defined by the torsion spring 3 clockwise around the intersection point 34. The coil portion 33 surrounds the positioning post 11 in the first area A1. The first free end 311 is adapted to connect the latch 2. In this embodiment, the housing includes a connection portion 13. The second free end 321 is connected to the connection portion 13. In one embodiment, the second free end 321 can be embedded into the connection 13, or, can be slidably connected to the connection portion 13.

Figure 6B:
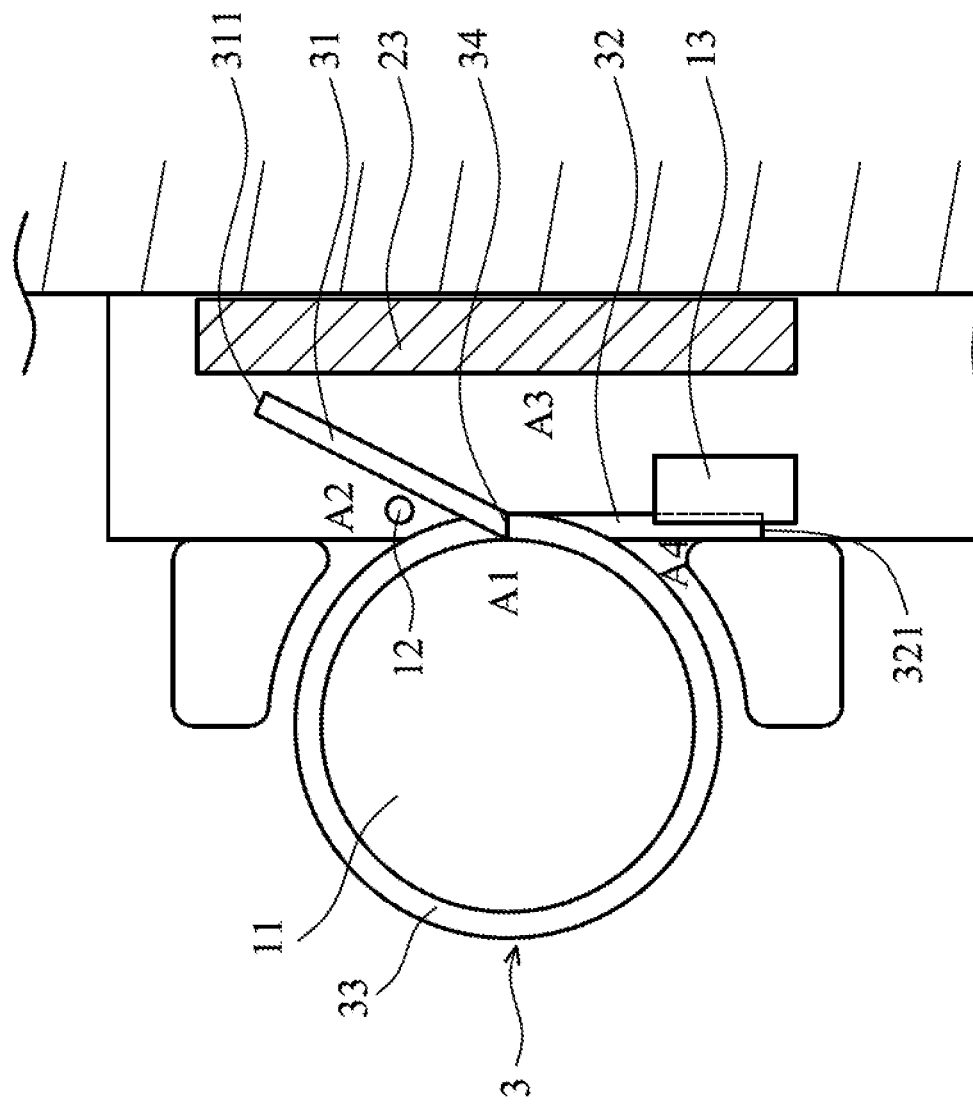
FIG. 6B shows the transceiver module of the sixth embodiment of the invention.
Figure 6C:
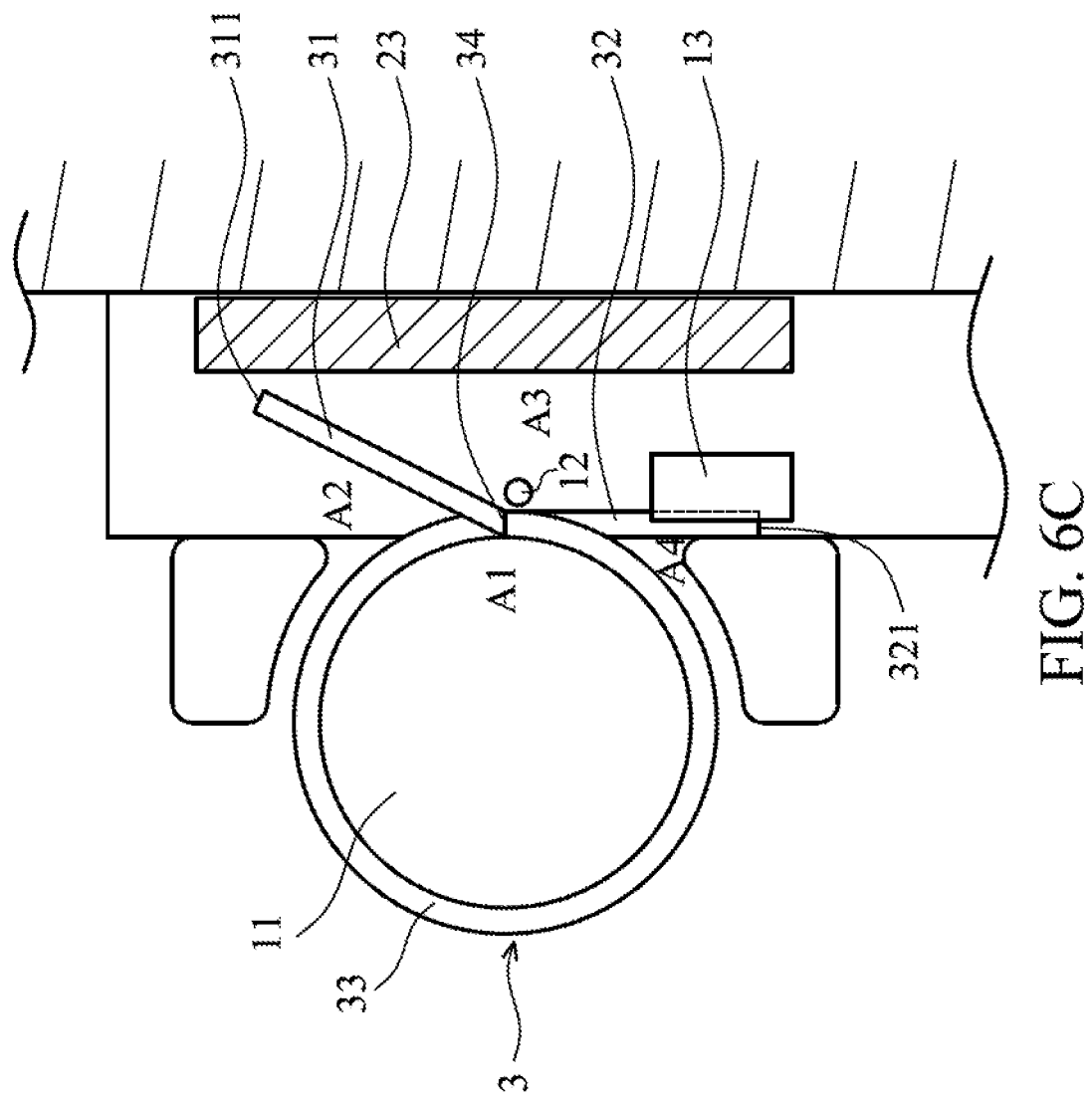
FIG. 6C shows the transceiver module of the seventh embodiment of the invention.

With reference to FIG. 6B, when the second free end 321 is embedded in the connection portion 13, the housing can still include a block 12. In this embodiment, the block 12 is adapted to abut the torsion spring 3 to restrict the deformation of the torsion spring 3. The torsion spring 3 applies an elastic force upon the latch 2, the connection portion 13 and the block 12. In this embodiment, the block 12 is in the second area A2, and is adapted to abut the first extending portion 31. With reference to FIG. 6C, in another embodiment, the block 12 is in the third area A3, and is adapted to abut the second extending portion 32.

In the embodiments above, only the one-side torsion spring and the related structure thereof is described. In one embodiment, two torsion springs and the related structure thereof are disposed on both sides of the housing. However, the disclosure is not meant to restrict the invention. Utilizing the embodiments of the invention, the movement reliability of the wedging protrusion can be improved by the latch and the torsion spring mentioned above.

With reference to FIGS. 1A, 1B and 1C, in one embodiment, the housing 1 includes an upper housing 14 and a lower housing 15. The upper housing 14 is combined with the lower housing 15 to improve electromagnetic shielding effect and to decrease electromagnetic interference upon the transceiver module. The upper housing 14 can be combined with the lower housing 15 by holder 6. The transceiver module of the embodiment of the invention can be a small form factor pluggable transceiver module. The transceiver module of the embodiment of the invention is separated from the cage by pull-tab design.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transceiver module, comprising:
    a housing, comprising a positioning post and a block;
    a latch, comprising a wedging protrusion; and
    a torsion spring, comprising a coil portion, a first extending portion and a second extending portion, wherein the first extending portion and the second extending portion are connected to the coil portion, the first extending portion comprises a first free end, the second extending portion comprises a second free end, and the first extending portion intersects the second extending portion at an intersection point on a projection plane;
    wherein a first area, a second area, a third area and a fourth area are defined by the torsion spring clockwise around the intersection point, the coil portion surrounds the positioning post in the first area, and the first free end is adapted to connect the latch;
    wherein when the latch is moved from a first latch position to a second latch position, the latch applies a pushing force upon the torsion spring, the block abuts the torsion spring to restrict the rotation of the torsion spring, the torsion spring applies an elastic force upon the latch and the block, and the wedging protrusion of the latch moves from a first wedging protrusion position to a second wedging protrusion position.

2. The transceiver module as claimed in claim 1, wherein the block is located in the second area, and is adapted to abut the first extending portion.

3. The transceiver module as claimed in claim 1, wherein the block abuts the first extending portion at an abutting point, and a distance between the abutting point and the intersection point is less than one third of a length of the first extending portion.

4. The transceiver module as claimed in claim 1, wherein the block is located in the third area, and is adapted to abut the second extending portion.

5. The transceiver module as claimed in claim 4, wherein the block abuts the second extending portion at an abutting point, a distance between the abutting point and the intersection point is less than one third of a length of the second extending portion.

6. The transceiver module as claimed in claim 4, wherein the block abuts the second extending portion at an abutting point, a distance between the abutting point and the second free end is less than two thirds of the length of the second extending portion.

7. The transceiver module as claimed in claim 1, wherein the block is a cylinder, a polygonal pillar or an irregular-shaped pillar.

8. The transceiver module as claimed in claim 1, further comprising a handle, wherein the handle pivots on the latch, and the latch pivots on the housing.

9. The transceiver module as claimed in claim 8, wherein when the handle is moved from a first handle position to a second handle position, the latch is rotated from the first latch position to the second latch position, and the wedging protrusion is moved from the first wedging protrusion position to the second wedging protrusion position.

10. The transceiver module as claimed in claim 1, wherein the latch pivots around a pivot direction relative to the housing, and an extension direction of the positioning post parallel to the pivot direction.

11. A transceiver module, comprising:
a housing, comprising a positioning post and a connection portion;
a latch, comprising a wedging protrusion; and
a torsion spring, comprising a coil portion, a first extending portion and a second extending portion, wherein the first extending portion and the second extending portion are connected to the coil portion, the first extending portion comprises a first free end, the second extending portion comprises a second free end, and the first extending portion intersects the second extending portion at an intersection point on a projection plane;
wherein a first area, a second area, a third area and a fourth area are defined by the torsion spring clockwise around the intersection point, the coil portion surrounds the positioning post in the first area, the first free end is adapted to connect the latch, and the second free end is connected to the connection portion;
wherein when the latch is moved from a first latch position to a second latch position, the torsion spring applies an elastic force upon the latch and the connection portion, and the wedging protrusion of the latch moves from a first wedging protrusion position to a second wedging protrusion position.

12. The transceiver module as claimed in claim 11, wherein the housing further comprises a block, and when the latch is moved from the first latch position to the second latch position, the block abuts the torsion spring to restrict the rotation of the torsion spring, and the torsion spring applies the elastic force on the latch, the connection portion and the block.

13. The transceiver module as claimed in claim 12, wherein the block is located in the second area, and is adapted to abut the first extending portion.

14. The transceiver module as claimed in claim 12, wherein the block is located in the third area, and is adapted to abut the second extending portion.

15. The transceiver module as claimed in claim 12, wherein the block is a cylinder, a polygonal pillar or an irregular-shaped pillar.

16. The transceiver module as claimed in claim 11, further comprising a handle, wherein the handle pivots on the latch, and the latch pivots on the housing.

17. The transceiver module as claimed in claim 16, wherein when the handle is moved from a first handle position to a second handle position, the latch is rotated from the first latch position to the second latch position, and the wedging protrusion is moved from the first wedging protrusion position to the second wedging protrusion position.

18. The transceiver module as claimed in claim 11, wherein the latch pivots around a pivot direction relative to the housing, and an extension direction of the positioning post parallel to the pivot direction.

* * * * *